(12) United States Patent
Räntilä et al.

(10) Patent No.: US 12,444,117 B2
(45) Date of Patent: Oct. 14, 2025

(54) SERVER-SIDE EXTENDED-REALITY PRE-COMPOSITION

(71) Applicant: Varjo Technologies Oy, Helsinki (FI)

(72) Inventors: Tarmo Räntilä, Helsinki (FI); Mikko Strandborg, Helsinki (FI); Antti Hirvonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 93 days.

(21) Appl. No.: 18/505,859

(22) Filed: Nov. 9, 2023

(65) Prior Publication Data
US 2025/0157123 A1    May 15, 2025

(51) Int. Cl.
| | |
|---|---|
| G06T 15/00 | (2011.01) |
| G06T 5/50 | (2006.01) |
| G06T 7/11 | (2017.01) |
| G06T 7/50 | (2017.01) |
| G06T 9/00 | (2006.01) |

(52) U.S. Cl.
CPC ............. G06T 15/00 (2013.01); G06T 5/50 (2013.01); G06T 7/11 (2017.01); G06T 7/50 (2017.01); G06T 9/00 (2013.01); *G06T 2207/20221* (2013.01)

(58) Field of Classification Search
CPC ... G06T 15/00; G06T 5/00; G06T 7/11; G06T 7/50; G06T 9/00; G06T 2207/20221
USPC .......................................................... 345/419
See application file for complete search history.

(56) References Cited

U.S. PATENT DOCUMENTS

| | | | |
|---|---|---|---|
| 11,361,513 B2 * | 6/2022 | Lohr | G06F 3/011 |
| 2021/0409677 A1 * | 12/2021 | Milk | H04N 13/111 |
| 2024/0212179 A1 * | 6/2024 | Valli | H04N 19/597 |
| 2025/0118033 A1 * | 4/2025 | Lee | G06Q 30/0643 |

FOREIGN PATENT DOCUMENTS

| | | | | |
|---|---|---|---|---|
| CN | 112785682 A | * | 5/2021 | G06T 7/0002 |
| CN | 115272047 A | * | 11/2022 | G09G 5/397 |

* cited by examiner

Primary Examiner — Benny Q Tieu
(74) Attorney, Agent, or Firm — ZIEGLER IP LAW GROUP, LLC.

(57) ABSTRACT

A system includes at least one server that is communicably coupled to at least one display apparatus. The at least one server is configured to obtain a real-world depth map corresponding to a target pose, and obtain a plurality of virtual-reality (VR) images and a plurality of VR depth maps for the target pose, wherein the plurality of VR images are generated by respective ones of a plurality of rendering applications that are executing at the at least one server. Further, the at least one server is configured to composite the plurality of VR images to generate a single VR image, based on the real-world depth map and the plurality of VR depth maps; and send the single VR image to the at least one display apparatus.

14 Claims, 6 Drawing Sheets

SERVER-SIDE EXTENDED-REALITY PRE-COMPOSITION

TECHNICAL FIELD

The present disclosure relates to a system incorporating a server-side extended-reality pre-composition. Furthermore, the present disclosure relates to a method incorporating a server-side extended-reality pre-composition.

BACKGROUND

Conventionally, in extended-reality (XR) or virtual-reality (VR) systems, head mounted displays (HMDs) are operated by a compositor configured within the HMDs. The compositor obtains multiple images or frames as inputs from cameras or rendering applications, performs various operations, such as composition, lens and colour aberration correction, timewarping, and the like, on the obtained images or frames to produce one or more final images (or framebuffers) which are displayed to a user wearing the HMDs. During operation, the compositor receives the inputs (i.e., the multiple images or frames) from multiple sources, such as rendering applications, video-see-through (VST) color cameras or depth cameras (e.g., Time-of-Flight (ToF) or Light Detection and Ranging (LIDAR), etc.) mounted over the HMDs or the like. Typically, the inputs received from such sources are mixed together based on various blending modes defined by respective rendering applications to generate final image(s). The decision on which pixel to display and whether any of the inputs are mixed together depends on various parameters, such as "layer order" of each rendering application, chrome key, alpha channel, blending mode of rendering application, blend masks, and the like. The aforementioned parameters bring additional complexity to the compositor.

Furthermore, in case of remote XR systems, where the rendering applications reside on a remote server, such as a cloud server and contents are displayed on a client device, supporting multiple simultaneous applications causes bandwidth and video codec requirements to grow linearly as the number of applications increases. Moreover, in case of the remote server, rendering is performed at the remote server through rendering applications and the composition is performed by the compositor at the client device. The technical challenge with performing the composition at the client device is that the images received from the depth cameras are not synchronized with that of VST color camera images which may produce motion-to-photons latency during composition. In addition, due to lower resolution of images captured by the depth cameras as compared to the VST color cameras, the compositor is configured to upscale the images captured by the depth cameras, which is computationally intensive and non-feasible to be done on the client HMD. Thus, there exist a technical problem of how to reduce bandwidth requirements at the remote server for supporting multiple rendering applications simultaneously as well as to reduce computational complexity at the compositor.

Therefore, in light of the foregoing discussion, there exists a need to overcome the aforementioned drawbacks associated with the conventional ways of image composition.

SUMMARY

The aim of the present disclosure is to provide a system and method to reduce bandwidth requirements at a remote server for supporting multiple rendering applications simultaneously as well as to reduce computational complexity at the compositor. The aim of the present disclosure is achieved by a system that comprises at least one server that is communicably coupled to at least one display apparatus and a method implemented at the system as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
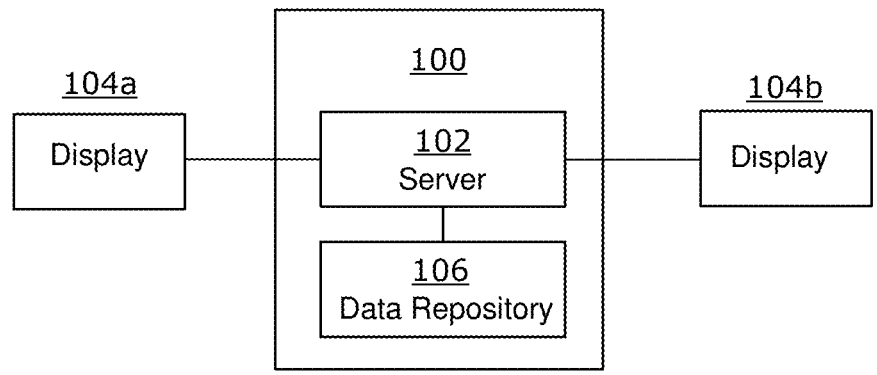
FIG. 1 illustrates a block diagram of an architecture of a system incorporating a server-side extended-reality pre-composition, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system comprising at least one server that is communicably coupled to at least one display apparatus, wherein the at least one server is configured to:
  obtain a real-world depth map corresponding to a target pose;
  obtain a plurality of virtual-reality (VR) images and a plurality of VR depth maps for the target pose, wherein the plurality of VR images are generated by respective ones of a plurality of rendering applications that are executing at the at least one server;

composite the plurality of VR images to generate a single VR image, based on the real-world depth map and the plurality of VR depth maps; and send the single VR image to the at least one display apparatus.

In a second aspect, the present disclosure provides a method comprising:

obtaining, by at least one server, a real-world depth map corresponding to a target pose;

obtaining, by the at least one server, a plurality of virtual-reality (VR) images and a plurality of VR depth maps for the target pose, wherein the plurality of VR images are generated by respective ones of a plurality of rendering applications that are executing at the at least one server;

compositing, by the at least one server, the plurality of VR images to generate a single VR image, based on the real-world depth map and the plurality of VR depth maps; and sending, by the at least one server, the single VR image to at least one display apparatus.

The present disclosure provides the aforementioned system and the aforementioned method for generating pose-consistent, high-quality, and realistic images in real time or near-real time (i.e., with minimal delay/latency). By generating the single VR image by compositing the plurality of VR images based on the real-world depth map and the plurality of VR depth maps by the at least one server, the aforementioned system eliminates the requirement for transporting multiple individual VR images to the at least one display apparatus. Therefore, the aforementioned system substantially reduces the bandwidth requirements by transmitting the single VR image to the at least one display apparatus. By acquiring and processing data at the at least one server, including the real-world depth map and the plurality of VR depth maps, the system optimizes the composition process. The aforementioned system generates the single VR image with enhanced depth information and transmits the single VR image to the at least one display apparatus for immediate visualization, which minimizes latency during composition, ensuring a smoother and more responsive user experience in virtual reality. The aforementioned system solves the technical problem of latency and bandwidth requirement by performing key operations centrally on the at least one server, thereby reducing the computational load and bandwidth requirements on the client side. The use of the real-world depth map by the at least one server in the system enhances depth perception by allowing accurate placement and rendering of objects based on their relative distances. The resulting single VR image, effectively composed with optimal depth considerations, is then transmitted to the at least one display apparatus, presenting an immersive XR/VR experience while alleviating bandwidth constraints.

Notably, the at least one server controls an overall operation of the system. In some implementations, the at least one server is implemented as a remote server. In an example, the remote server could be a cloud server that provides a cloud computing service, and could be arranged in a geographical location that is different from a geographical location of the at least one display apparatus. In an implementation, the at least one server may be a master server or a master machine that is a part of a data center that controls an array of other cloud servers communicatively coupled to it for load balancing, running customized applications, and efficient data management. Examples of the at least one server may include, but are not limited to, an application server, a data server, or an electronic data processing device. In other implementations, the at least one server is implemented as a processor of a computing device that is communicably coupled to at least one display apparatus. Examples of the computing device include, but are not limited to, a laptop, a desktop, a tablet, a phablet, a personal digital assistant, a workstation, and a console.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers.

The "display apparatus" is a specialized equipment that is capable of at least displaying one or more VR images generated by the at least one server. Optionally, the display apparatus is implemented as a head-mounted display (HMD). The term "head-mounted display" refers to specialized equipment that is configured to present an XR environment to the user when said HMD, in operation, is worn by the user on his/her head. The HMD is implemented, for example, as an XR headset, a pair of XR glasses, and the like, that is operable to display a visual scene of the XR environment to the user.

In operation, the at least one server is configured to obtain the real-world depth map corresponding to the target pose. Throughout the present disclosure, the term "real-world depth map" refers to a data structure that contains information about the optical depths of objects or specific parts of objects within a real-world environment. In other words, the real-world depth map is a digital representation of the distances or depths of objects or surfaces in the physical, real-world environment from the display apparatus. The real-world depth map provides information about how far each point lies in the real-world from a specific reference point. In an implementation, the real-world depth map is generated by the at least one display apparatus based on depth information (i.e., distances of objects in the real-world environment from the at least one display apparatus) obtained from one or more of depth sensors or cameras, such as time-of-flight (ToF) cameras, light detection and ranging (LiDAR) sensors, and the like, arranged on the at least one display apparatus.

Throughout the present disclosure, the term "pose" encompasses both a viewing position and a viewing direction of the at least one display apparatus that is present in a real-world environment. The term "target pose" refers to a specific desired position and orientation of the at least one display apparatus corresponding to which the one or more VR images are to be generated.

In an implementation, the at least one server is configured to obtain a new real-world depth map by reprojecting the real-world depth map previously received from the ToF cameras and/or LiDAR sensors arranged at the at least one display apparatus. In another implementation, the real-world depth map is obtained by using a three-dimensional (3D) model of the real-world environment that was previously created based on VST images and depth maps generated by the ToF camera or LiDAR sensors arranged at the at least one display apparatus. Optionally, the at least one server may be configured to perform operations, such as hole filling, filtering, and the like, over the real-world depth map obtained from the ToF camera and/or LiDAR sensors.

In operation, the at least one server is further configured to obtain a plurality of virtual-reality (VR) images and a plurality of VR depth maps for the target pose. Moreover, the plurality of VR images are generated by respective ones of the plurality of rendering applications that are executing at the at least one server. Throughout the present disclosure, the term "rendering application" refers to a software component in the at least one server, which is configured to perform various rendering operations to generate the plurality of VR images and the plurality of VR depth maps. Throughout the present disclosure, the term "VR depth map" refers to a depth map of objects in a virtual environment. In an implementation, the at least one server is configured to one VR depth map for each image from the plurality of VR images based on depth map generated by one or more of ToF cameras or LiDAR sensors arranged on the at least one display apparatus. In an implementation, the at least one server may be configured to generate the plurality of VR images through the rendering applications by receiving inputs, such as 3D model of the virtual reality (VR) environment, camera parameters (such as position and orientation of the at least one display apparatus in the VR environment (i.e., the target pose)), lighting conditions and the like.

Optionally, the at least one server is configured to obtain the 3D model in the VR environment from at least one data repository that is communicably coupled to the at least one server. In such a case, the 3D model is pre-generated (for example, by the at least one server), and pre-stored at the at least one data repository. It will be appreciated that the at least one data repository could be implemented, for example, such as a memory of the at least one server, a memory of the computing device, a memory of the at least one display apparatus, a removable memory, a cloud-based database, or similar. Optionally, the system further comprises the at least one data repository.

The term "three-dimensional model" (3D model) of the virtual-reality environment refers to a data structure that comprises comprehensive information pertaining to objects or their parts present in the virtual-reality environment. Such comprehensive information is indicative of at least one of: surfaces of the objects or their parts, a plurality of features of the objects or their parts, shapes and sizes of the objects or their parts, poses of the objects or their parts, materials of the objects or their parts, colour information of the objects or their parts, depth information of the objects or their parts, light sources and lighting conditions within the virtual-reality environment. The term "object" refers to a physical object or a part of the physical object that is present in the virtual-reality environment. An object could be a living object (for example, such as a human, a pet, a plant, and the like) or a non-living object (for example, such as a wall, a building, a shop, a road, a window, a toy, a poster, a lamp, and the like). Examples of the plurality of features include, but are not limited to, edges, corners, blobs, a high-frequency feature, a low-frequency feature, and ridges.

Optionally, the 3D model of the virtual-reality environment is in a form of at least one of: a 3D polygonal mesh, a 3D point cloud, a 3D surface cloud, a 3D surf let cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the 3D model are well-known in the art.

In an implementation, the at least one server is configured to generate the VR environment based on the real-world depth map by reconstructing a three-dimensional (3D) representation of the real-world environment. The at least one server is configured to obtain depth information of each object in the real-world environment from sensors or cameras, such as ToF camera, LiDAR sensors and the like, to generate the VR environment.

Optionally, when generating the plurality of VR images, the at least one server is configured to utilise the 3D model of the VR environment. Optionally, in this regard, the at least one server is configured to employ at least one data processing algorithm. The at least one data processing algorithm would enable in transforming a 3D point in the 3D model to a 2D point in one VR image from the plurality of VR images. In an implementation, the at least one server is configured to obtain the target pose of the at least one display apparatus in the VR environment and executes the plurality of rendering applications based on the target pose. Moreover, each rendering application is configured to render a different view of the VR environment from the target pose.

In an implementation, the at least one server is configured to generate the plurality of VR depth maps based on the plurality of VR images by calculating depth values of pixels in the plurality of VR images based on the distances of objects in the VR environment. In order to calculate the depth values, the at least one server is configured to implement techniques such as ray tracing or ray casting, where virtual rays are projected from the at least one display apparatus (i.e., viewer's perspective) into the VR environment.

The at least one server is further configured to composite the plurality of VR images to generate the single VR image, based on the real-world depth map and the plurality of VR depth maps. The at least one server is configured to process each VR image based on the depth information obtained from both the plurality of VR depth maps and the real-world depth map and adjust the rendering in the plurality of VR images to create a depth-enhanced version of each VR image from the plurality of VR images. Further, the at least one server is configured to layer (or position) the depth-enhanced version of each VR image one above the other based on the depth information of the corresponding VR depth map. For example, the VR images having objects closer to the at least one display apparatus (i.e., having smaller depth values) are placed in front and the VR images having objects far from the at least one display apparatus are placed behind. Further, the at least one server is configured to apply blending techniques to create the single VR image. The blending technique ensures visually coherent and realistic single VR image.

Some of the rendering applications may be executing at different servers, in a case where the at least one server includes a plurality of servers. In such a case, a single server could be configured to collect the plurality of VR images from these different servers, and then perform the compositing operation. In an implementation, the at least one server is configured to composite the plurality of VR images based on at least one of: a layer ordering between the plurality of VR images, and alpha values of at least one of the plurality of VR images. The at least one server is configured to determine an order or arrangement in which the plurality of VR images are layered on top of each other. Such arrangement affects the final appearance of the single VR image. The order of layers of the plurality of VR images is determined based on depth information of each VR image (obtained from the VR depth maps). For example, an image in a higher layer may partially or fully obscure parts of the images in lower layers. Each VR image contains pixels with associated alpha values. The alpha value of a pixel represents its transparency level. A higher alpha value means the pixel is more opaque, while a lower value indicates more transparency. The at least one server uses the layer ordering and the alpha values of the pixels in the VR images to blend together.

Optionally, the at least one server is configured to send, to the at least one display apparatus, the single VR image along with an alpha mask indicating a transparency level of a given pixel of the single VR image. Throughout the present disclosure, the term "alpha mask" refers to a supplementary data layer that accompanies the single VR image and provides transparency information for each pixel of the single VR image. In other words, the alpha mask indicates the level of transparency (or opacity) for a specific pixel in the single VR image. In an implementation, the at least one server is configured to send the alpha mask using an alpha channel. The term "alpha channel" refers to a set of numerical data (referred as alpha values) associated with each pixel in the VR image, where each numerical value indicates transparency level of each pixel in the VR image. In another implementation, the at least one server is configured to send the alpha mask in a form of a 1-bit visibility bitmask that indicates whether a given pixel of the single VR image is visible or not. The term "bitmask" is a binary sequence where each bit represents a specific property or characteristic for each pixel in the VR image. The '1' bit in the bitmask indicates that the corresponding pixel in the VR image is visible, that is, opaque or partially transparent (up to 80 percent transparent). The '0' bit in the bitmask indicates that the corresponding pixel is not visible, that is, fully transparent or almost fully transparent (for instance, 95 percent or more transparent). The at least one server sends the final composite VR image to the at least one display apparatus along with the alpha mask, which guides the display of the VR image by specifying the transparency levels for different parts of the VR image. Such approach enables the at least one server to render complex visual scenes with varying levels of transparency, contributing to a more realistic and visually appealing VR experience. In an implementation, the at least one server is configured to perform operations such as timewarping and/or colour aberration correction on the single VR image prior sending to the at least one display apparatus. The term "timewarping" refers to a technique used in VR to adjust the rendering of the single VR image based on the orientation and position of the head of the user wearing the at least one display apparatus. The timewarping operation is beneficial to reduce motion to photons latency produced in the plurality of VR images and provides a smoother VR experience. The term "color aberration" refers to color distortions that can occur at the edges of objects in the single VR image. Therefore, timewarping and colour aberration correction enables the system to improve quality of the single VR image displayed at the at least one display apparatus.

The system of any of the preceding claims, wherein the at least one server is configured to:
split the single VR image into a plurality of stripes; and
encode the plurality of stripes of the single VR image into a plurality of encoded stripes, wherein the single VR image is sent in a form of the plurality of encoded stripes.

The term "stripe" refers to a rectangular section obtained by dividing the single VR image. The at least one server is configured to select equally spaced rectangular divisions within the single VR image. In an example, if the VR image is divided into four stripes, the at least one server is configured to determine and delineate four equally sized rectangular sections. The rectangular sections may correspond to either horizontal sections or vertical sections or angular sections depending on orientation of a display panel(s) associated with the display apparatus and the direction in which the display panel(s) is scanned. Alternatively, the single VR image may be divided into either horizontal stripes, or vertical stripes or angular stripes based on the direction of scanning. In an implementation scenario, the topmost scan line is updated first, starting from the left most pixel moving to the right, and then next scan lines are updated similarly in a top-to-bottom order. In an implementation, the at least one server is configured to analyze the pixel values, colors, transparency, and other relevant data for each divided stripe. Further, the at least one server is configured to employ compression algorithms to represent the relevant data in a more condensed form by removing redundancies and irrelevant information. Furthermore, the at least one server is configured to employ encoding algorithms to convert the analyzed data into a binary or numerical representation (i.e., encoded data) that can be easily transmitted and reconstructed. The encoded stripe is a compressed, compact representation of that portion of the original VR image. The division of the VR image into stripes allows for efficient processing and transmission. Further, encoding the stripes improves data handling and storage, optimizing resource utilization and transmitting the encoded stripes to the at least display apparatus enhances bandwidth efficiency, facilitating faster and smoother data transfer.

The splitting of the single VR image into the plurality of stripes increases parallelism while transporting the single VR image from the at least one server to the at least one display apparatus, that is, the process of splitting the single VR image into multiple stripes enables such stripes to be processed concurrently or in parallel. The splitting of the single VR image reduces total execution time for processing the single VR image. In an implementation, if Z % represents an additional computational time introduced by the splitting process, N represents the number of stages or computational steps and X represents the number of stripes the image is split into, then the total execution time is increased by a factor (F) given by following equation (1) as:

$$F = (1 + Z/100) * Y * (1 + (N-1)/X) \qquad (1)$$

Optionally, the plurality of encoded stripes are sent from the at least one server to the at least one display apparatus in a sequential manner. In an example, the single VR image may be divided into a plurality of encoded vertical stripes, the at least one server may be configured to transmit the encoded stripes to the at least one display apparatus sequentially from left to right direction or right to left direction. In another example, the single VR image may be divided into a plurality of encoded horizontal stripes, the at least one server may be configured to transmit the encoded stripes to the at least one display apparatus sequentially from top to bottom or bottom to top direction. In an implementation, the at least one server is configured to divide the single VR image into horizontal stripes as the VR image is usually drawn using a raster pattern. The sequential transmission of the plurality of encoded stripes reduces the overall latency (including motion to photons latency) in displaying the VR image and ensure faster response to the user while interacting with the VR content.

Optionally, the at least one server is configured to divide a given stripe into at least a first block, two second blocks and two third blocks, where a $N^{th}$ block lies between two $N+1^{th}$ blocks. Moreover, when encoding the given stripe, the at least one server is configured to pack, into a corresponding encoded stripe, first pixel data of the first block at a first resolution, second pixel data of the two second blocks at a second resolution, and third pixel data of the two third blocks at a third resolution, wherein a $N+1^{th}$ resolution is lower than a $N^{th}$ resolution. The term "block" refers to distinct sections or segments within each divided stripe, which encapsulate pixel data associated with specific regions of the single VR image. In an implementation scenario, the first block may lie between two second blocks and the first block and the two second blocks may lie between the two third blocks. Additionally, the given stripe may be divided into two fourth blocks, two fifth blocks and so on. Each block includes pixel data such color, depth, or other relevant attributes, which are required for accurate representation of the VR environment. In an implementation, the pixel data typically includes information about the color of the pixel, often represented by values for red, green, and blue (in RGB color space), and sometimes additional information like alpha (for transparency), depth, or other attributes. The third resolution is higher than the second resolution and the second resolution is higher than the first resolution. During encoding, the at least one server is configured to pack the pixel data from each block into the encoded stripe. The first pixel data from the first block is packed at the first resolution. The second pixel data from the two second blocks is packed at the second resolution, whereas the third pixel data from the two third blocks is packed at the third resolution. By packing pixel data at different resolutions for different blocks, the system optimizes transmission data size by providing higher resolution for areas, such as first block to preserve image quality, while providing lower resolution for areas, such as third block which further results in a reduced data size.

In an implementation, the resolution to be used in each of the first block, the second block and the third block may be selected freely. In some embodiments, the first resolution is the same as the resolution in the single VR image and the second resolution is $\frac{1}{4}^{th}$ of the first resolution, which allows the maximum available resolution to be maintained in the most important part or parts of the single VR image. If there are also blocks having a third resolution, this third resolution may be $\frac{1}{16}^{th}$ of the first resolution. In an example, the first block holds the first pixel data of the highest resolution, which is intended to be displayed in the area of the single VR image that the user is focusing on, for example, in the middle of the single VR image. The two second blocks hold the second pixel data of the second highest resolution, intended to be displayed in areas adjacent to the first pixel data of the first block, typically on either side. The two third blocks hold pixel data to be displayed in areas adjacent to the second pixel data of the two second blocks, respectively.

The system of any of the preceding claims, wherein the at least one server is configured to:
receive, from the at least one display apparatus, first pose information indicative of at least a pose of the at least one display apparatus over a first time period;
estimate a first predicted pose corresponding to a future time instant, based on the first pose information, wherein the first predicted pose is employed as the target pose for obtaining the real-world depth map, the plurality of VR images and the plurality of VR depth maps;
receive, from the at least one display apparatus, second pose information indicative of at least the pose of the at least one display apparatus over a second time period that ends after the first time period;
estimate a second predicted pose corresponding to the future time instant, based on the second pose information; and
reproject the single VR image from the first predicted pose to the second predicted pose using a first reprojection algorithm, prior to sending the single VR image to the at least one display apparatus.

It will be appreciated that the at least one server receives the first pose information from the at least one display apparatus in real time or near-real time (i.e., without any latency/delay). It will also be appreciated that the pose of the at least one display apparatus may not necessarily be same during an entirety of a given time period and may change at different time instants during the given time period. In such a case, given pose information would be indicative of different poses of the at least one display apparatus corresponding to the different time instants during the given time period. The term "given pose information" encompasses the first pose information and the second pose information. The term "given time period" encompasses the first time period and the second time period.

Optionally, the at least one display apparatus comprises pose-tracking means for tracking at least the pose of the at least one display apparatus. In this regard, given pose information is collected by the pose-tracking means of the at least one display apparatus. Apart from tracking the pose, the pose-tracking means may also be employed to track a velocity and/or an acceleration with which the pose changes. In such a case, the given pose information may also be indicative of the velocity and/or the acceleration with which the pose changes.

It will be appreciated that the pose-tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), and the like. The pose-tracking means may employ an outside-in tracking technique, an inside-out tracking technique, or a combination of both the aforesaid techniques, for collecting the given pose information that is indicative of at least the pose of the at least one display apparatus. It will be appreciated that the given pose information may be collected by the pose-tracking means, i.e., continuously, periodically (for example, after every 10 milliseconds), or intermittently (for example, after 10 milliseconds, and then again after 50 milliseconds, and so on).

Optionally, the given pose information is collected by the pose-tracking means in a global coordinate space. Herein, the term "global coordinate space" refers to a 3D space of the real-world environment that is represented by a global coordinate system. The second time period (during which the second pose information is collected by the pose-tracking means) may or may not partially overlap with the first time period. However, since the second time period ends after the first time period, the second pose information is indicative of more recent/latest poses of the at least one display apparatus, as compared to the first pose information.

Therefore, it is highly likely that the second predicted pose is significantly more accurate and more precise than the first predicted pose It will be appreciated that the first reprojection algorithm may comprise at least one space warping algorithm, and may perform any of: a three degrees-of-freedom (3DOF) reprojection, a six degrees-of-freedom (6DOF) reprojection, a nine degrees-of-freedom (9DOF) reprojection. It is to be understood that the 6DOF reprojection and the 9DOF reprojection are relatively more accurate, but are slightly computationally intensive as compared to the 3DOF reprojection. The reprojection algorithms and the three aforesaid reprojections are well-known in the art.

Instead of estimating a predicted pose of the at least one display apparatus just once for the future time instant, the at least one server (remotely) estimates the first predicted pose and the second predicted pose based on pose information collected at different time periods (namely, the first time period and the second time period, which may partially overlap). Beneficially, in such a case, the second predicted pose is even more accurate and recent/up-to-date with respect to the future time instant, as compared to the first predicted pose. Moreover, the at least one server employs the first reprojection algorithm to perform a computationally-intensive reprojection (in a first round) for generating the single VR image (that is to be sent to the at least one display apparatus). Beneficially, this potentially reduces a computational burden due to a subsequent reprojection (in a second round) at the at least one display apparatus. In this manner, pose-consistent, high-quality VR image is generated for displaying at the at least one display apparatus, even when delay (for example, due to communication network traffic, transmission, compression-related overheads, and the like) are present between the at least one server and the at least one display apparatus. Thus, the system minimizes motion-to-photons latency and stuttering, when displaying the single VR image at the at least one display apparatus. Resultantly, this leads to an optimal (i.e., highly realistic), immersive viewing experience for the user using the at least one display apparatus, when the single VR image is displayed to said user.

Optionally, the at least one display apparatus, wherein the at least one display apparatus is configured to:
  collect third pose information indicative of at least the pose of the at least one display apparatus over a third time period that ends after the second time period;
  estimate a third predicted pose corresponding to the future time instant, based on the third pose information;
  reproject the single VR image from the second predicted pose to the third predicted pose using a second reprojection algorithm;
  obtain a video-see-through (VST) image for the third predicted pose; and
  composite the single VR image and the VST image, to generate an output image.

Notably, upon receiving the single VR image, the third pose information is collected by the at least display apparatus. The third time period (during which the third pose information is collected by the pose-tracking means) may or may not partially overlap with the second time period. However, since the third time period ends after the second time period, the third pose information is indicative of even more recent poses of the at least one display apparatus, as compared to the second pose information. Therefore, it is highly likely that the third predicted pose is even more significantly accurate and precise than the second predicted pose. In other words, the third predicted pose may be understood to be a rectified version of the second predicted pose of the at least one display apparatus. It is to be understood that the third time period ends after the second time period but still earlier than the future time instant. It will be appreciated that the at least one display apparatus collects the third pose information in real-time or near-real time. Estimation of the third predicted pose is performed by (a processor of) the at least one display apparatus in a similar manner as discussed earlier with respect to the first predicted pose (that is estimated by the at least one server).

Further, since the third predicted pose is more accurate and up-to-date than the second predicted pose with respect to the future time instant, the at least one display apparatus is configured to reproject the single VR image to match the perspective of the third predicted pose, according to a difference between the second predicted pose and the third predicted pose. In other words, the at least one display apparatus adjusts the single VR image, originally projected at the second predicted pose, to match the newly predicted third pose. Such adjustment is done using the second reprojection algorithm, ensuring the VR image aligns precisely with the expected pose.

It will be appreciated that the first reprojection algorithm and the second reprojecting algorithm may comprise at least one space warping algorithm, and may perform any of: a three degrees-of-freedom (3DOF) reprojection, a six degrees-of-freedom (6DOF) reprojection, a nine degrees-of-freedom (9DOF) reprojection.

Concurrently, the at least one display apparatus is configured to capture a video-see-through (VST) image for the third predicted pose. The VST image typically provides a view of the real-world environment as seen through a camera on the at least one display apparatus. In an implementation, the at least one display apparatus is configured to obtain the VST image by capturing the VST image and reprojecting the VST image from its original pose to the third predicted pose in case the original pose is different from the third predicted pose. The at least one display apparatus combines the adjusted VR image (reprojected to the third predicted pose) with the captured VST image. Such compositing process merges the virtual content (VR image) with the real-world view (VST image) to generate a final output image.

Notably, upon generating the output image, (the processor of) the at least one display apparatus is configured to display the output image, for example, via at least one light source of the at least one display apparatus. The term "light source" refers to an element from which light emanates. Optionally, the at least one light source is implemented as a display or a projector. Displays and projectors are well-known in the art. The at least one light source may be a single-resolution light source or a multi-resolution light source. It will be appreciated that the output image is displayed at the at least one display apparatus at the future time instant, or at another refined/corrected time instant (that could be sooner or later than the future time instant). By estimating and adjusting the single VR image to predicted future poses of the at least one display apparatus, the system achieves a higher degree of alignment between the virtual content and the real-world environment as perceived by the at least one display apparatus. By combining the VST image, which provides a view of the real environment, with the VR image, the system enriches the overall experience by adding contextual and real-world details to the virtual content. This integration results in a more realistic and immersive VR experience.

The present disclosure also relates to the method as described above. Various embodiments and variants disclosed above, with respect to the aforementioned system apply mutatis mutandis to the method.

Optionally, the method further comprising:
sending, by the at least one server, the single VR image along with an alpha mask indicating a transparency level of a given pixel of the single VR image to the at least one display apparatus.

Optionally, the method comprising:
splitting, by the at least one server, the single VR image into a plurality of stripes; and
encoding, the at least one server, the plurality of stripes of the single VR image into a plurality of encoded stripes, wherein the single VR image is sent in a form of the plurality of encoded stripes.

Optionally, the method further comprising:
sending, the at least one server, the plurality of encoded stripes to the at least one display apparatus in a sequential manner.

Optionally, the method further comprising:
dividing, by the at least one server, a given stripe into at least a first block, two second blocks and two third blocks, wherein a $N^{th}$ block lies between two $N+1^{th}$ blocks;
wherein when encoding the given stripe, the at least one server is configured to pack, into a corresponding encoded stripe, first pixel data of the first block at a first resolution, second pixel data of the two second blocks at a second resolution, and third pixel data of the two third blocks at a third resolution, wherein a $N+1^{th}$ resolution is lower than a $N^{th}$ resolution.

Optionally, the method comprising:
receiving, by the at least one server, first pose information from the at least one display apparatus indicative of at least a pose of the at least one display apparatus over a first time period;
estimating, by the at least one server, a first predicted pose corresponding to a future time instant, based on the first pose information, wherein the first predicted pose is employed as the target pose for obtaining the real-world depth map, the plurality of VR images and the plurality of VR depth maps;
receiving, by the at least one server, second pose information from the at least one display apparatus, indicative of at least the pose of the at least one display apparatus over a second time period that ends after the first time period;
estimating, by the at least one server, a second predicted pose corresponding to the future time instant, based on the second pose information; and
reprojecting, by the at least one server, the single VR image from the first predicted pose to the second predicted pose using a first reprojection algorithm, prior to sending the single VR image to the at least one display apparatus.

Optionally, the method further comprising:
collecting, by the at least one server, a third pose information from the at least one display apparatus indicative of at least the pose of the at least one display apparatus over a third time period that ends after the second time period;
estimating, by the at least one server, a third predicted pose corresponding to the future time instant, based on the third pose information;
reprojecting, by the at least one server, the single VR image from the second predicted pose to the third predicted pose using a second reprojection algorithm;
obtaining, by the at least one server, a video-see-through (VST) image for the third predicted pose; and
compositing, by the at least one server, the single VR image and the VST image, to generate an output image.

DETAILED DESCRIPTION OF THE DRAWINGS

Referring to FIG. 1, illustrated a block diagram of an architecture of a system 100 incorporating a server-side extended-reality pre-composition, in accordance with an embodiment of the present disclosure. The system 100 comprises at least one server (depicted as a server 102). The server 102 is communicably coupled to at least one display apparatus (depicted as display apparatuses 104a and 104b). Optionally, the system 100 further comprises at least one data repository (depicted as a data repository 106).

It may be understood by a person skilled in the art that the FIG. 1 includes a simplified architecture of the system 100 for sake of clarity, which should not unduly limit the scope of the claims herein. It is to be understood that a specific implementation of the system 100 is provided as an example and is not to be construed as limiting it to specific numbers or specific types of servers, client devices, and data repositories. The person skilled in the art will recognize many variations, alternatives, and modifications of embodiments of the present disclosure.

Figure 2:
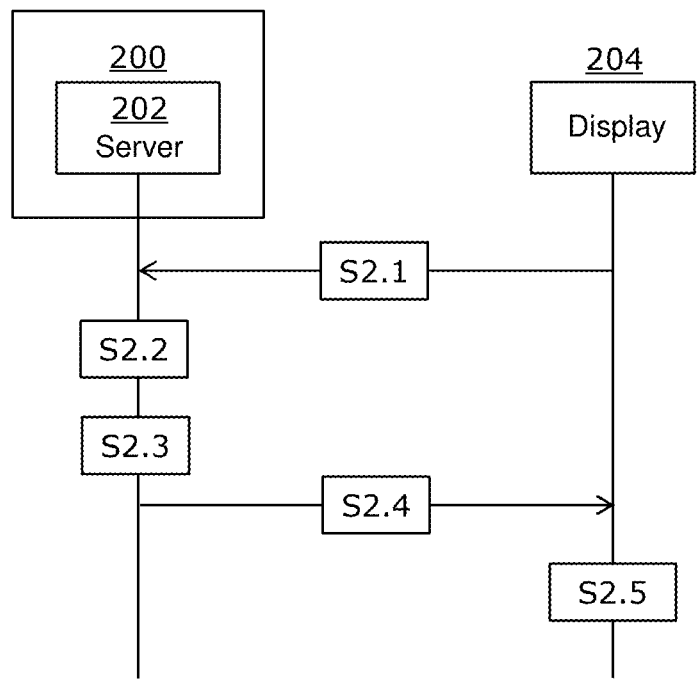
FIG. 2 illustrates a sequence diagram showing operational steps of a system incorporating server-side extended-reality pre-composition, in accordance with an embodiment of the present disclosure.

Referring to FIG. 2, illustrated is a sequence diagram showing operational steps of a system 200 incorporating server-side extended-reality pre-composition, in accordance with an embodiment of the present disclosure. The system 200 comprises at least one server (depicted as a server 202) that is communicably coupled to at least one display apparatus (depicted as a display apparatus 204). At step S2.1, real-world depth map is received at the server 202 from the display apparatus 204. At step S2.2, a plurality of virtual-reality (VR) images and a plurality of VR depth maps for the target pose are obtained by the server 202, the plurality of VR images are generated by respective ones of a plurality of rendering applications that are executing at the server 202. At step S2.3, a single VR image is generated at the server 202 by compositing the plurality of VR images based on the real-world depth map and the plurality of VR depth maps. At step S2.4, the single VR image is sent by the server 202 to the display apparatus 204. At step S2.5, the single VR image is displayed at the display apparatus 204.

Figure 3:
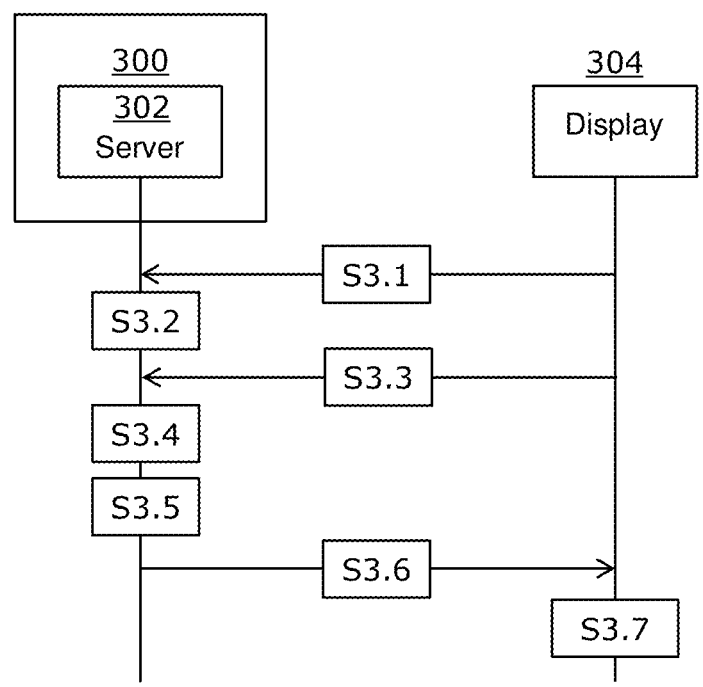
FIG. 3 illustrates a sequence diagram showing operational steps of a system incorporating server-side extended-reality pre-composition, in accordance with another embodiment of the present disclosure.

Referring to FIG. 3, illustrated is a sequence diagram showing operational steps of a system 300 incorporating server-side extended-reality pre-composition, in accordance with another embodiment of the present disclosure. The system 300 comprises at least one server (depicted as a server 302) that is communicably coupled to at least one display apparatus (depicted as a display apparatus 304). At step S3.1, a first pose information is received at the server 302 from the display apparatus 304, the first pose information being indicative of at least a pose of the display apparatus 304 over a first time period. At step S3.2, a first predicted pose corresponding to a future time instant is estimated at the server 302, based on the first pose information. The first predicted pose is employed as the target pose for obtaining the real-world depth map, the plurality of VR images and the plurality of VR depth maps. At step S3.3, a second pose information is received at the server 302 from the display apparatus 304, the second pose information being indicative of at least the pose of the display apparatus 304 over a second time period that ends after the first time period. At step S3.4, a second predicted pose corresponding to the future time instant is estimated at the server 302, based on the second pose information. At step S3.5, a single VR image is reprojected by the server 302 from the first predicted pose to the second predicted pose using a first reprojection algorithm. At step S3.6, the single VR image is sent from the server 302 to the display apparatus 304. At step S3.7, the single VR image is displayed by the display apparatus 304.

Figure 4:
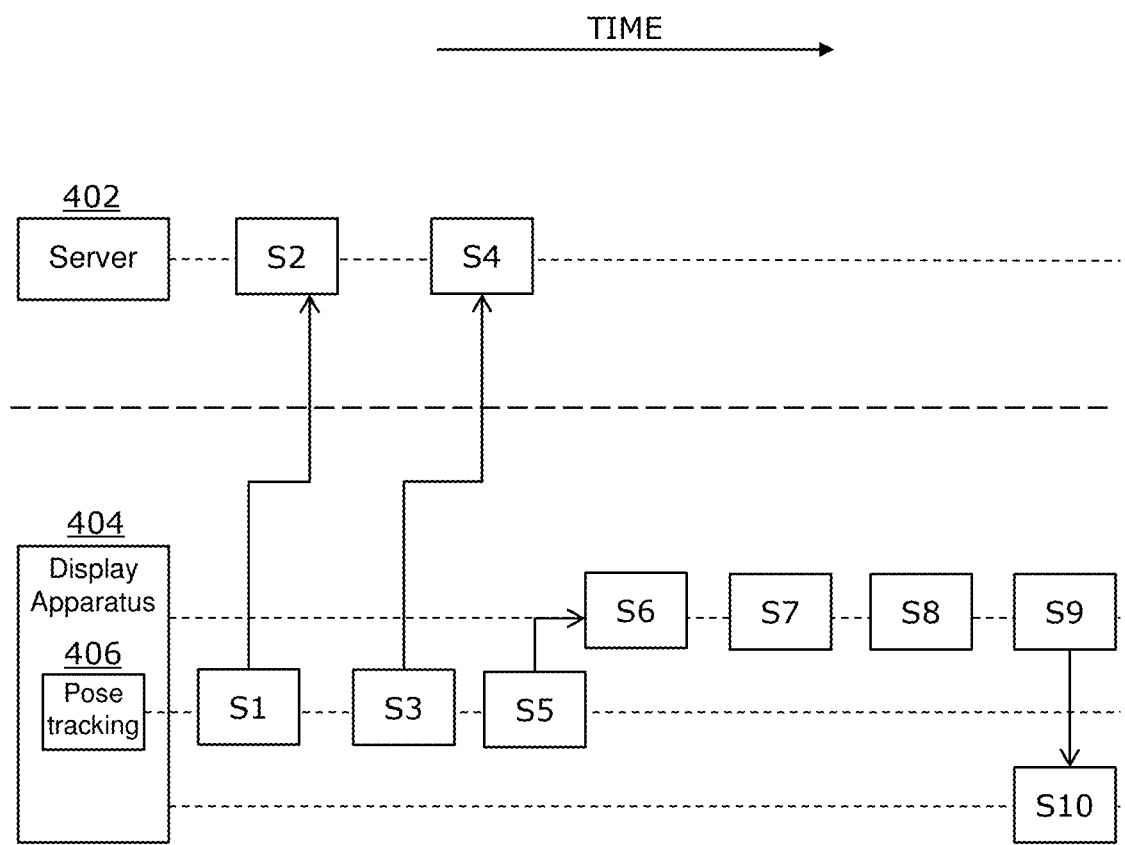
FIG. 4 illustrates a sequence diagram showing operational steps of a system incorporating server-side extended-reality pre-composition, in accordance with yet another embodiment of the present disclosure.

Referring to FIG. 4, illustrated is a sequence diagram showing operational steps of a system incorporating server-side extended-reality pre-composition, in accordance with yet another embodiment of the present disclosure. The system comprises at least one server (depicted as a server 402) that is communicably coupled to at least one display apparatus (depicted as a display apparatus 404). The display apparatus 404 is shown to comprise a pose-tracking means 406. At step S1, first pose information is sent from the pose-tracking means 406 to the server 402, the first pose information being indicative of at least a pose of the display apparatus 404 over a first time period. At step S2, a first predicted pose corresponding to a future time instant is estimated by the server 402 based on the first pose information. The first predicted pose is employed as the target pose for obtaining the real-world depth map, the plurality of VR images and the plurality of VR depth maps. At step S3, second pose information is sent from the pose-tracking means 406 to the server 402, the second pose information being indicative of at least the pose of the display apparatus 404 over a second time period that ends after the first time period. At step S4, a second predicted pose corresponding to the future time instant is estimated by the server 402 based on the second pose information. At step S5, a third pose information is collected by the pose-tracking means 406, the third pose information being indicative of at least the pose of the display apparatus 404 over a third time period that ends after the second time period. At step S6, a third predicted pose corresponding to the future time instant is also estimated by the display apparatus 404 based on the third pose information. At step S7, the single VR image is reprojected by the display apparatus 404 from the second predicted pose to the third predicted pose using a second reprojection algorithm. At step S8, a video-see-through (VST) image for the third predicted pose is obtained by the display apparatus 404. At step S9, the single VR image and the VST image are composited by the display apparatus 404 to generate an output image. At step S10, the output image is displayed by the display apparatus 404.

Figure 5:
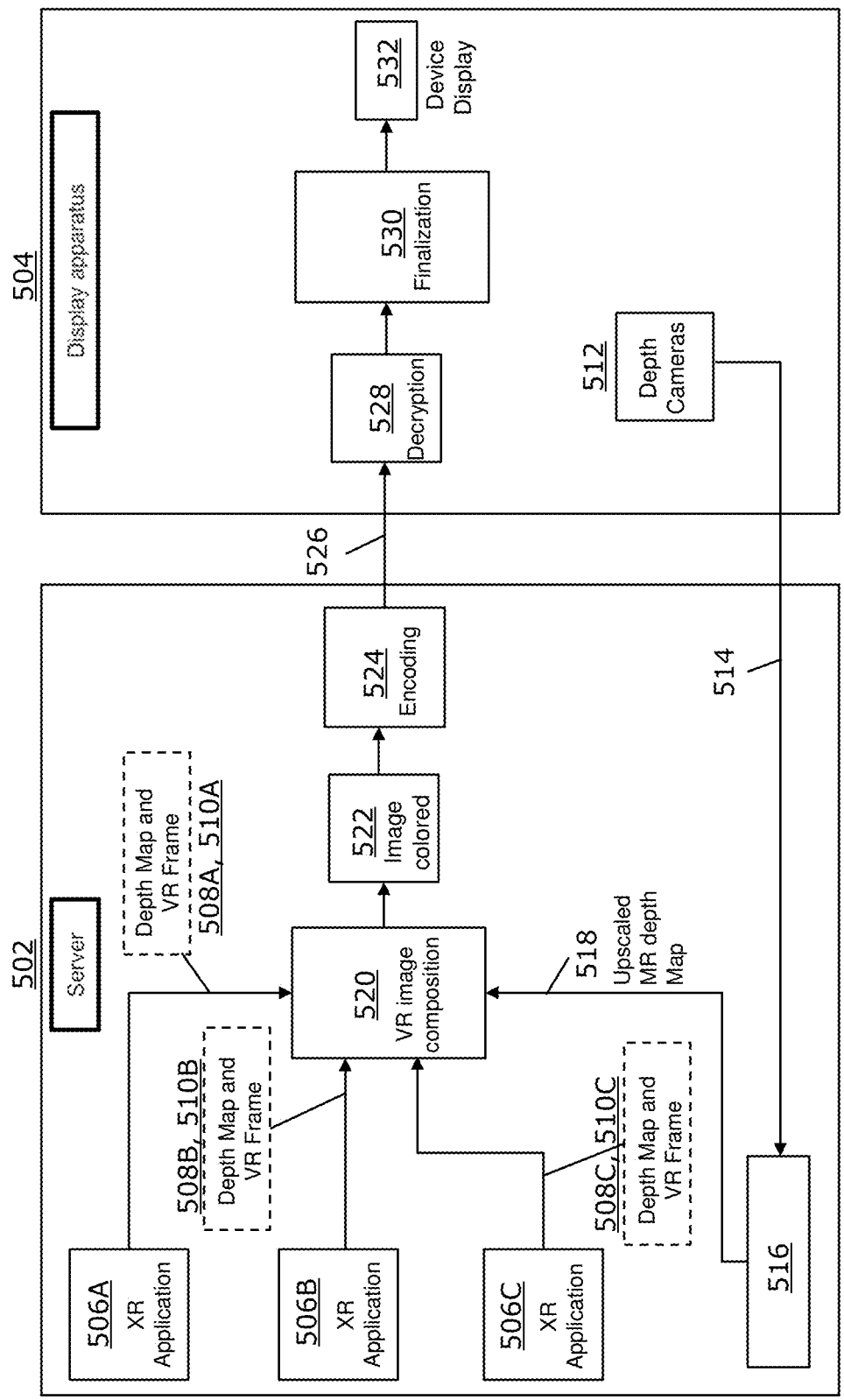
FIG. 5 illustrates a block diagram showing operations of a system incorporating server-side extended-reality pre-composition, in accordance with another embodiment of the present disclosure.

Referring to FIG. 5, illustrated is a block diagram showing operations of a system incorporating server-side extended-reality pre-composition, in accordance with yet another embodiment of the present disclosure. The system includes a server 502 communicatively coupled to a display apparatus 504. The server 502 includes a plurality of extended reality (XR) applications (or rendering applications), such as a first XR application 506A, a second XR application 506B and a third XR application 506C. Each of the plurality of XR applications generate a plurality of VR frames (or images) and, optionally, a plurality of depth maps. Referring to FIG. 5, the first XR application 506A generates a first VR frame 508A and, optionally, a first depth map 510A. The second XR application 506B generates a second VR frame 508B and, optionally, a second depth map 510B. Furthermore, the third XR application 506C generates a third VR frame 508C and, optionally, a third depth map 510C.

In addition, one or more depth cameras 512 (such as time of flight (ToF) depth camera and a light detection and ranging (LiDAR) depth camera) are arranged with the display apparatus 504. At operation 514, the one or more depth cameras 512 are configured to transport the real-world depth map to the server 502. Furthermore, at operation 516, the server 502 is configured to process the real-world depth map, that is, a mixed reality (MR) depth map to obtain an upscaled and reprojected MR depth map 518. Furthermore, at operation 520, the server 502 is configured to composite the first VR frame 508A (optionally, along with the first depth map 510A), the second VR frame 508B (optionally, along with the second depth map 510B), the third VR frame 508C (optionally, along with the third depth map 510C) and the upscaled and reprojected MR depth map 518 to obtain a single VR image. Further, at operation 522, the server 502 is configured to apply color map and visibility mask (such as bitmask) to the single VR image to add color and suitable transparency (based on alpha mask) to the single VR image. Thereafter, at operation 524, the server 502 is configured to perform texture packing on the single VR image along with encoding of the single VR image (for encrypting the single VR image). After encoding, at operation 526, the server 502 is configured to transmit the encoded single VR image to the display apparatus 504. Furthermore, at operation 528, the display apparatus 504 is configured to unpack, decode, and decrypt the encoded single VR image. In addition, at operation 530, the display apparatus 504 is configured to perform final composition operations, such as timewarping, lens correction and the like to obtain a final output VR image. Further, at operation 532, the display apparatus 504 is configured to display the final output VR image to a user wearing the display apparatus 504.

Figure 6:
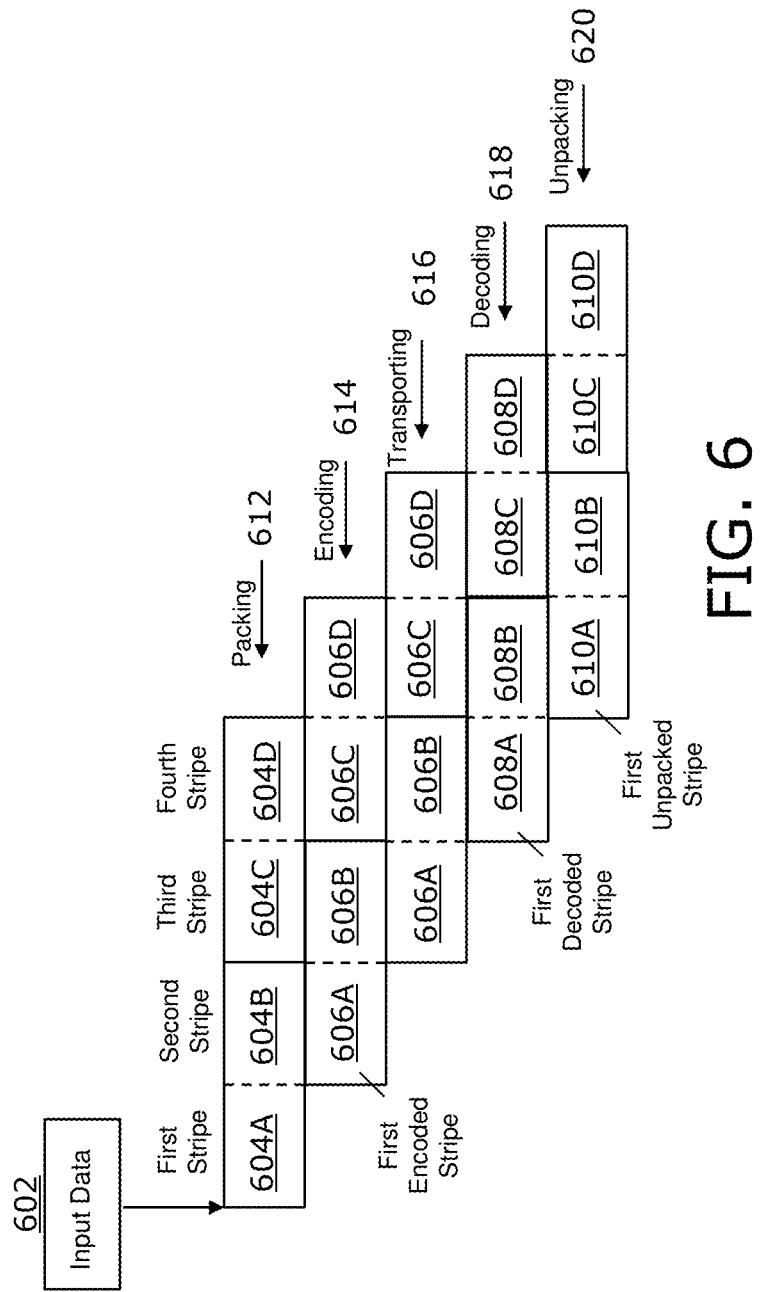
FIG. 6 illustrates a block diagram of striped pre-composition performed by a system for incorporating server-side extended-reality pre-composition, in accordance with an embodiment of the present disclosure.

Referring to FIG. 6, illustrated is a diagram of striped pre-composition performed by a system for incorporating server-side extended-reality pre-composition, in accordance with an embodiment of the present disclosure. With reference to FIG. 6, there is shown an input data 602 that comprises two VR image frames, for instance, a first VR image frame and a second VR image frame. The first VR image frame is divided into a first stripe 604A and a second stripe 604B and the second VR image frame is divided into a third stripe 604C and a fourth stripe 604D. Here, the striped pre-composition is performed in five stages-packing, encoding, transporting, decoding, and unpacking at operation 612, 614, 616, 618 and 620, respectively.

At operation 612, each of the first stripe 604A and the second stripe 604B of the first VR image frame is packed with pixel data of the first VR image frame. Similarly, each of the third stripe 604C and the fourth stripe 604D of the second VR image frame is packed with pixel data of the second VR image frame at operation 612. At operation 614, each of the first stripe 604A and the second stripe 604B of the first VR image frame is encoded to obtain a first encoded stripe 606A and a second encoded stripe 606B. Similarly, each of the third stripe 604C and the fourth stripe 604D of the second VR image frame is encoded to obtain a third encoded stripe 606C and a fourth encoded stripe 606D, at operation 614. Moreover, the encoding of the first stripe 604A starts just after completion of packing of the first stripe 604A. Similarly, the encoding of the third stripe 604C starts just after completion of packing of the third stripe 604C. Additionally, the encoding of the first stripe 604A is performed in parallelism with packing of the second stripe 604B (which is contrary to conventional pre-composition methods where encoding of a first VR image frame starts only when packing of both stripes of the first VR image frame is finished). At operation 616, each of the first encoded stripe 606A and the second encoded stripe 606B of the first VR image frame, and each of the third encoded stripe 606C and the fourth encoded stripe 606D of the second VR image frame is transmitted to at least one display apparatus. The transmission of the first encoded stripe 606A is performed in parallelism with encoding of the second stripe 604B. Similarly, the transmission of the second encoded stripe 606B is performed in parallelism with encoding of the third stripe 604C and so on. At operation 618, the at least one display apparatus is configured to decode the first encoded stripe 606A and the second encoded stripe 606B of the first VR image frame to obtain a first decoded stripe 608A and a second decoded stripe 608B. Similarly, a third decoded stripe 608C and a fourth decoded stripe 608D is obtained by decoding of the third encoded stripe 606C and the fourth encoded stripe 606D, respectively, of the second VR image frame. The decoding of the first encoded stripe 606A is performed in parallelism with transmission of the second encoded stripe 606B. Similarly, the decoding of the second encoded stripe 606B is performed in parallelism with transmission of the third encoded stripe 606C and so on. At operation 620, the at least one display apparatus is configured to unpack the first decoded stripe 608A and the second decoded stripe 608B of the first VR image frame to obtain a first unpacked stripe 610A and a second unpacked stripe 610B, respectively. Similarly, a third unpacked stripe 610C and a fourth unpacked stripe 610D is obtained by unpacking of the third decoded stripe 608C and the fourth decoded stripe 608D, respectively, of the second VR image frame. The unpacking of the first decoded stripe 608A is performed in parallelism with decoding of the second encoded stripe 606B. Similarly, the unpacking of the second decoded stripe 608B is performed in parallelism with decoding of the third encoded stripe 606C and so on. The splitting of each stage (of the five stages) into smaller stripes (or subunits) increases parallelism during pre-composition of the first VR image frame and the second VR image frame. Such parallel execution or parallelism reduces latency of the VR images and enhance the visual clarity of the VR images displayed to the user. With reference to FIG. 6, the striped pre-composition is performed in five stages (i.e., N=5) and each VR image is split into two stripes (i.e., X=2). Here, the value of overhead, that is Z=20. Therefore, based on the equation 1, the value of the factor (F) is calculated as:

$$F = (1 + 20/100) * 1 * (1 + (5-1)/2) = 3.6$$

The factor (F) obtains latency reduction as =3.6/5=0.28 (i.e., 28%). Therefore, with increase in number of stripes, more latency reduction is achieved.

Figure 7:
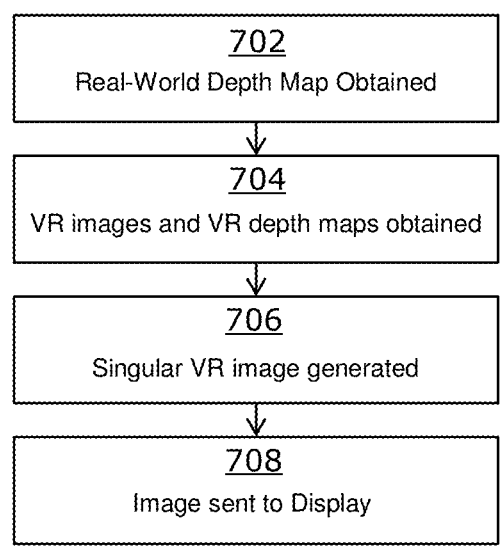
FIG. 7 illustrates steps of a method incorporating server-side extended-reality pre-composition, in accordance with another embodiment of the present disclosure.

Referring to FIG. 7, illustrated is a method incorporating server-side pre-composition, in accordance with another extended-reality embodiment of the present disclosure. At step 702, a real-world depth map corresponding to a target pose is obtained by at least one server. At step 704, a plurality of virtual-reality (VR) images and a plurality of VR depth maps for the target pose by the at least one server is obtained. The plurality of VR images are generated by respective ones of a plurality of rendering applications that are executing at the at least one server. At step 706, the plurality of VR images are composited by the at least one server to generate a single VR image, based on the real-world depth map and the plurality of VR depth maps. At step 708, the single VR image is sent by the at least one server to at least one display apparatus.

The invention claimed is:

1. A system comprising at least one server that is communicably coupled to at least one display apparatus, wherein the at least one server is configured to:
   obtain a real-world depth map corresponding to a target pose;
   obtain a plurality of virtual-reality (VR) images and a plurality of VR depth maps for the target pose, wherein the plurality of VR images are generated by respective ones of a plurality of rendering applications that are executing at the at least one server;
   composite the plurality of VR images to generate a single VR image, based on the real-world depth map and the plurality of VR depth maps; and
   send the single VR image to the at least one display apparatus.

2. The system of claim 1, wherein the at least one server is configured to send, to the at least one display apparatus, the single VR image along with an alpha mask indicating a transparency level of a given pixel of the single VR image.

3. The system of claim 1, wherein the at least one server is configured to:
   split the single VR image into a plurality of stripes; and
   encode the plurality of stripes of the single VR image into a plurality of encoded stripes, wherein the single VR image is sent in a form of the plurality of encoded stripes.

4. The system of claim 3, wherein the plurality of encoded stripes are sent from the at least one server to the at least one display apparatus in a sequential manner.

5. The system of claim 3, wherein the at least one server is configured to divide a given stripe into at least a first block, two second blocks and two third blocks, wherein an $N^{th}$ block lies between two $N+1^{th}$ blocks,
   wherein when encoding the given stripe, the at least one server is configured to pack, into a corresponding encoded stripe, first pixel data of the first block at a first resolution, second pixel data of the two second blocks at a second resolution, and third pixel data of the two third blocks at a third resolution, wherein an $N+1^{th}$ resolution is lower than an $N^{th}$ resolution.

6. The system of claim 1, wherein the at least one server is configured to:
   receive, from the at least one display apparatus, first pose information indicative of at least a pose of the at least one display apparatus over a first time period;
   estimate a first predicted pose corresponding to a future time instant, based on the first pose information, wherein the first predicted pose is employed as the target pose for obtaining the real-world depth map, the plurality of VR images and the plurality of VR depth maps;
   receive, from the at least one display apparatus, second pose information indicative of at least the pose of the at least one display apparatus over a second time period that ends after the first time period;
   estimate a second predicted pose corresponding to the future time instant, based on the second pose information; and
   reproject the single VR image from the first predicted pose to the second predicted pose using a first reprojection algorithm, prior to sending the single VR image to the at least one display apparatus.

7. The system of claim 6, further comprising the at least one display apparatus, wherein the at least one display apparatus is configured to:

collect third pose information indicative of at least the pose of the at least one display apparatus over a third time period that ends after the second time period;

estimate a third predicted pose corresponding to the future time instant, based on the third pose information;

reproject the single VR image from the second predicted pose to the third predicted pose using a second reprojection algorithm;

obtain a video-see-through (VST) image for the third predicted pose; and composite the single VR image and the VST image, to generate an output image.

8. A method comprising obtaining, by at least one server, a real-world depth map corresponding to a target pose;

obtaining, by the at least one server, a plurality of virtual-reality (VR) images and a plurality of VR depth maps for the target pose, wherein the plurality of VR images are generated by respective ones of a plurality of rendering applications that are executing at the at least one server;

compositing, by the at least one server, the plurality of VR images to generate a single VR image, based on the real-world depth map and the plurality of VR depth maps; and sending, by the at least one server, the single VR image to at least one display apparatus.

9. The method of claim 8, further comprising:

sending, by the at least one server, the single VR image along with an alpha mask indicating a transparency level of a given pixel of the single VR image to the at least one display apparatus.

10. The method of claim 8, comprising:

splitting, by the at least one server, the single VR image into a plurality of stripes; and encoding, the at least one server, the plurality of stripes of the single VR image into a plurality of encoded stripes, wherein the single VR image is sent in a form of the plurality of encoded stripes.

11. The method of claim 10, further comprising:

sending, the at least one server, the plurality of encoded stripes to the at least one display apparatus in a sequential manner.

12. The method of claim 10, comprising:

dividing, by the at least one server, a given stripe into at least a first block, two second blocks and two third blocks, wherein an $N^{th}$ block lies between two $N+1^{th}$ blocks;

wherein when encoding the given stripe, the at least one server is configured to pack, into a corresponding encoded stripe, first pixel data of the first block at a first resolution, second pixel data of the two second blocks at a second resolution, and third pixel data of the two third blocks at a third resolution, wherein an $N+1^{th}$ resolution is lower than an $N^{th}$ resolution.

13. The method of claim 8, comprising:

receiving, by the at least one server, first pose information from the at least one display apparatus indicative of at least a pose of the at least one display apparatus over a first time period;

estimating, by the at least one server, a first predicted pose corresponding to a future time instant, based on the first pose information, wherein the first predicted pose is employed as the target pose for obtaining the real-world depth map, the plurality of VR images and the plurality of VR depth maps;

receiving, by the at least one server, second pose information from the at least one display apparatus, indicative of at least the pose of the at least one display apparatus over a second time period that ends after the first time period;

estimating, by the at least one server, a second predicted pose corresponding to the future time instant, based on the second pose information; and reprojecting, by the at least one server, the single VR image from the first predicted pose to the second predicted pose using a first reprojection algorithm, prior to sending the single VR image to the at least one display apparatus.

14. The method of claim 13, further comprising:

collecting, by the at least one server, a third pose information from the at least one display apparatus indicative of at least the pose of the at least one display apparatus over a third time period that ends after the second time period;

estimating, by the at least one server, a third predicted pose corresponding to the future time instant, based on the third pose information;

reprojecting, by the at least one server, the single VR image from the second predicted pose to the third predicted pose using a second reprojection algorithm;

obtaining, by the at least one server, a video-see-through (VST) image for the third predicted pose; and compositing, by the at least one server, the single VR image and the VST image, to generate an output image.

* * * * *